(12) United States Patent
Di-Principe et al.

(10) Patent No.: US 8,834,947 B2
(45) Date of Patent: Sep. 16, 2014

(54) IN-LINE HEATING PROCESS

(75) Inventors: Antonio Di-Principe, Cisterna di Latina (IT); Jasper David Hidde Kelder, Vlaardingen (NL); Ilio Sebastiani, Poznan (PL)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 13/641,773

(22) PCT Filed: Apr. 4, 2011

(86) PCT No.: PCT/EP2011/055182
§ 371 (c)(1),
(2), (4) Date: Oct. 17, 2012

(87) PCT Pub. No.: WO2011/134743
PCT Pub. Date: Nov. 3, 2011

(65) Prior Publication Data
US 2013/0034644 A1    Feb. 7, 2013

(30) Foreign Application Priority Data
Apr. 27, 2010 (EP) .................................. 10161167

(51) Int. Cl.
| A23L 3/01 | (2006.01) |
| A23B 4/005 | (2006.01) |
| A23L 1/39 | (2006.01) |
| A23L 1/025 | (2006.01) |
| A23L 3/22 | (2006.01) |

(52) U.S. Cl.
CPC ............... *A23B 4/0053* (2013.01); *A23L 1/39* (2013.01); *A23L 1/0252* (2013.01); *A23L 1/0255* (2013.01); *A23L 3/01* (2013.01); *A23L 3/22* (2013.01)

USPC ........... 426/241; 426/244; 426/589; 426/590; 426/521

(58) Field of Classification Search
CPC ..................... A23L 1/025–1/0257; A23L 1/39; A23L 3/01; A23L 3/015; A23L 3/32
USPC ......... 426/231, 589, 590, 520–523, 241–243, 426/244, 238
See application file for complete search history.

(56) References Cited

U.S. PATENT DOCUMENTS

| 2,270,540 A | * | 1/1942 | Mallory ........................ 426/521 |
| 3,567,470 A | * | 3/1971 | McElroy ...................... 426/522 |

(Continued)

FOREIGN PATENT DOCUMENTS

| EP | 0457179 A1 | 11/1991 |
| WO | WO9304421 | 3/1993 |

(Continued)

OTHER PUBLICATIONS

European Search Report, Application No. EP 10 16 1167, dated Sep. 13, 2010.

(Continued)

*Primary Examiner* — Drew Becker
(74) *Attorney, Agent, or Firm* — Ellen Plotkin

(57) ABSTRACT

A process for heating a pumpable food product comprising the steps of: a) providing a pumpable food product, b) transporting the pumpable food product through a continuous flow passage, c) heating the pumpable food product during at least part of the transporting of step b), characterized in that the flow rate of transportation during step b) comprises phases of acceleration and phases of deceleration, wherein the phases of acceleration and of deceleration periodically repeat.

4 Claims, 1 Drawing Sheet

(56) References Cited

U.S. PATENT DOCUMENTS

| | | | | |
|---|---|---|---|---|
| 3,899,595 | A | * | 8/1975 | Stenne .............................. 426/36 |
| 3,949,099 | A | * | 4/1976 | Kaufman ....................... 426/521 |
| 4,637,936 | A | | 1/1987 | White et al. |
| 4,997,662 | A | * | 3/1991 | Lidman et al. ................. 426/231 |
| 5,514,391 | A | | 5/1996 | Bushnell et al. |
| 5,690,978 | A | * | 11/1997 | Yin et al. ....................... 426/237 |
| 6,231,908 | B1 | * | 5/2001 | Lelieveld et al. .............. 426/237 |
| 2008/0017623 | A1 | | 1/2008 | Dock |
| 2008/0160149 | A1 | | 7/2008 | Nasrallah et al. |
| 2008/0311259 | A1 | * | 12/2008 | Singh et al. .................... 426/330 |
| 2012/0276266 | A1 | * | 11/2012 | Tacke et al. .................... 426/521 |

FOREIGN PATENT DOCUMENTS

| | | |
|---|---|---|
| WO | WO0139604 A1 | 6/2001 |
| WO | WO2008132046 A1 | 11/2008 |

OTHER PUBLICATIONS

International Search Report, International Application No. PCT/EP2011/055182, mailed Jun. 1, 2011.

Written Opinion, International Application No. PCT/EP2011/055182.

* cited by examiner

IN-LINE HEATING PROCESS

BACKGROUND OF THE INVENTION

In-line heating is a thermal treatment used for pumpable products. In-line heating is intended to mean heating while the product to be heated is transported and is not stationary as e.g. in a container. In-line heating is especially applied in the field of food products. In-line heating may provide a means of pasteurizing or sterilizing a food product in a relatively fast and efficient way. It is in particular advantageous for pasteurizing or sterilizing of food products in which taste and/or texture may become affected upon extended heating. Examples of this kind of food products are soups and sauces comprising a liquid base and, possibly, pieces (e.g. meat, fish or vegetable). The quality of both the liquid base and the pieces may be adversely affected by conventional heating processes, in terms of for example taste and/or texture. Solid meat and/or vegetable pieces may contribute to a pleasant bite or mouthfeel in the soup and/or sauce. It may be appreciated by the consumer that organoleptic features like colour and taste are not affected by overcooking, and are preserved during the pasteurization or sterilisation process.

In-line heating devices to conduct this process are known in the art. They comprise closed flow passages where energy is transferred to the product by a process of convection and conduction, or directly deposited into the product by volumetric heat transfer means. This may involve energy transfer from a hot medium such as pressurized water or condensing steam, or it may concern volumetric energy deposition by volumetric means, examples being Ohmic, microwave or Radio Frequent heating.

Conventionally, the food product is pumped through the flow-passage at an approximately constant rate. A transport mechanism, like for example a pump, may be situated at the entrance of the heating tube and propels the food product through it.

A problem observed in the conventional process of in-line heating using an approximately constant flow rate is that most pumpable food products inside the flow passage exhibit marked residence time distributions. For Newtonian fluids in the laminar flow regime, for example this maximum velocity is double the average velocity of the stream. In general, any pumpable food product, either laminar or turbulent, has a velocity profile in tube flow and hence a residence time distribution is also present.

In conventional in-line heating systems each annular layer of product is therefore characterised by a different velocity and hence a different residence time in the flow passage and consequently by a different increase of temperature. The layer close to the wall of the flow passage may become overcooked compared to the relatively central layers. This problem becomes especially relevant when solid food particles are present in the pumpable food product, such as e.g. pieces of vegetable, and the organoleptic properties like taste and mouth feel deteriorate when they become overcooked.

To guarantee sufficient pasteurization or sterilisation of the food product in a conventional in-line heating process, the velocity used for the thermal calculation, is adjusted to the fraction in the tube which has the highest velocity at the cost of the quality of the slower moving parts. When adjusting the speed to the slower moving parts, to maintain for example their desired organoleptic features, the system doesn't enable a correct pasteurization or sterilisation process of the fraction with the highest velocity.

Accordingly, the aim of the present invention is to provide a process comprising in-line heating for a pumpable food product operated in such a fashion that overcooking of at least part of the food product is reduced, preferably, wherein overcooking of at least part of the food product does not occur. Preferably, such a process is easy to conduct using conventional flow passages in the heating device, allows easy cleaning of the flow passage and provides high process reliability. Preferably, the process operation is especially suitable for the pasteurization or sterilization of pumpable food products comprising solid particles.

SUMMARY OF THE INVENTION

Surprisingly, it has been found, that above mentioned problems could, at least partly, be overcome by a process for heating a pumpable food product comprising the steps of:
  a) providing a pumpable food product,
  b) transporting the pumpable food product through a continuous flow passage,
  c) heating the pumpable food product during at least part of the transporting of step b),
characterised in that the flow rate of transportation during step b) comprises phases of acceleration and phases of deceleration.

DETAILED DESCRIPTION OF THE INVENTION

Figure 1:
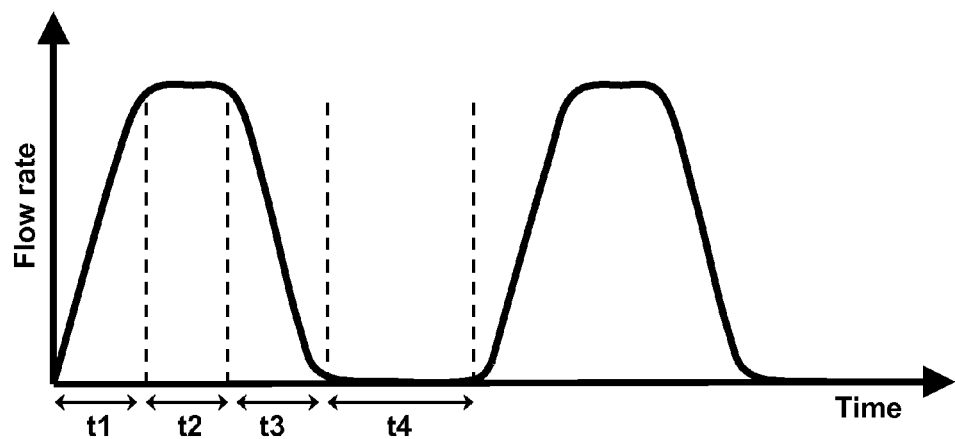
FIG. 1 shows a schematic diagram of the velocity versus time. A possible shape of this profile and the duration of the acceleration (t1), the optional constant velocity phase (t2), the deceleration phase (t3), and the optional restive period (t4) have been indicated.

It has been found in the present invention that the problem of overcooking in an in-line flow passage could be solved by accelerating and decelerating the food product as it moves through the flow passage. Hence, the transportation rate of the food product in the flow passage can be indicated with four separate phases. In a first phase the flow rate increases. In an optional second phase the flow rate is constant. In a third phase the flow rate decreases again, and in an optional fourth phase the flow rate is very low or the food product is not transported through the flow passage.

This mode of operation results in the food product moving with a fluctuating speed through the tube. We do not refer here to a difference in velocity that occurs as a result of laminar flow, in the sense that the central part of the content of the tube moves faster than the peripheral part, but to the average velocity (flow rate/section surface). The mass of food product is thus submitted to a continuous series of negative and positive accelerations. Preferably, there is a rapid change of velocity between a minimum velocity (usually zero m/s) and a maximum velocity. An example of the four phases in the transportation rate has been indicated in FIG. 1.

The present invention is characterized in that during transportation through the flow passage, the pumpable food product undergoes phases of acceleration and deceleration. In contrast, a conventional process comprises a phase of acceleration at the beginning of the process, to start transport of the food product and at the end of the process, to stop transportation of the food product through the flow passage.

Preferably, the present invention relates to a process wherein the phases of acceleration and of deceleration periodically repeat. Such a process shows a discontinuous movement comprising cycles whereby each cycle comprises an acceleration phase and a deceleration phase. The new flow rate process condition is able to delivery of the desired global food product average flow rate according to the thermal process parameters.

If the acceleration and deceleration are sufficiently high, the forces associated with it are larger than the viscous forces responsible for establishing the velocity profile.

This must be effected by a rapid change of velocity between a minimum velocity (preferably zero m/s) and a maximum velocity. The optimal time of acceleration depends on the internal pipe diameter, the density and the kinematic viscosity of the food product. Kinematic viscosity is defined in the customary way of viscosity/density.

It was found that the optimal duration of the acceleration phase can be defined by equation 1.

$$t1 < d^2/16\, v \quad\quad\quad 1)$$

Hence, preferably, the present invention relates to a process, wherein the phases of acceleration take a time t1, wherein $t1 < d^2/16\, v$, wherein d is the diameter of the flow passage (in meters) and v is the kinetic viscosity of the pumpable food product.

Preferably, the flow passage has a diameter of between 1 and 1000 mm, more preferred between 10 and 100 mm and most preferred between 20 and 80 mm. The continuous flow passage is preferably a heating tube, more preferably a volumetric heating tube. The flow passage is a continuous flow passage, which is intended to mean that the stream of pumpable food product is not interrupted by e.g. valves.

The food product to be heated by the process of the invention is a pumpable food product, i.e. a product that can be transported through a flow passage with the use of a pump. Depending on the type of product, the liquid phase of the pumpable food product may comprise various viscosities, for example as observed for a liquid product like a diluted solution, a more viscous product like a paste, and for liquids with particles. The kinematic viscosity of the liquid phase of the pumpable food product preferably is between $10^{-7}$ to $10\ m^2/s$ at 25° C. The advantage of the present invention is especially clear in pumpable food products having a kinematic viscosity that is not too low or high and hence the invention particularly relates to a process wherein the kinematic viscosity of the pumpable food product is between $10^{-6}$ and $10^{-3}\ m^2/s$ at 25° C.

Based on the range of passage dimension and kinematic viscosity combined using equation 1, and from mechanical limitations of relevant line-components, the time of acceleration t1 is preferably between $1*10^{-2}$ and 10 seconds, more preferably between $5*10^{-2}$ and 5 seconds and most preferably between $1*10^{-1}$ and 1 seconds.

As the process is preferably cyclic, the acceleration phase needs to be followed by a deceleration phase lasting t3 seconds where the liquid in the system may be effectively brought to zero velocity. The magnitude of the deceleration is opposite in sign compared to that of the acceleration phase. Deceleration is essentially the reverse of the acceleration phase. Preferably, in the process of the present invention the phases of deceleration have a duration of between $1*10^{-2}$ and 10 seconds. The time of deceleration t3 more preferably is between $5*10^{-2}$ and 5 seconds and most preferably between $1*10^{-1}$ and 1 seconds.

To allow the velocity profile to settle and to improve the longevity of the pump, a phase of constant velocity between the acceleration phase and the deceleration phase of the cycle may be preferred. For optimal efficacy of the process, the duration t2 of this phase of constant velocity is less than 100 seconds, more preferably shorter than 10 seconds and most preferably shorter than 1 second. Preferred ranges can for example be between 0 and 100 seconds, between 0.1 and 10 seconds or between 0.5 and 1 second. Hence, preferably, the present invention relates to a process wherein at least one phase of acceleration is followed by a phase of constant velocity.

Preferably after one cycle of acceleration, constant velocity and deceleration, the transportation rate of the pumpable food product may be very close to zero for a certain period of time t4. Preferably, in the process of the invention the phase of deceleration is followed by a rest period. This rest period may ensure that all liquid has come to a standstill and that the inertial forces in the liquid are maximal during the acceleration phase of the next cycle. Preferably, the speed of the pumpable food product in the rest period t4 is lower than 5 m/s, preferably lower than 2 m/s, even more preferably lower than 1 m/s, and most preferably the speed is substantially 0 m/s, and can for example be between 0 and 5 m/s, including 0 m/s, preferably between 0.01 and 5 m/s, more preferably between 0.05 and 2 m/s, and most preferably, between 0.1 and 1 m/s. The rest period after deceleration phase has a duration which is between preferably 0.1 and 200 seconds, more preferably 0.1 and 20 seconds, and most preferably 0.1 and 2 second.

The present invention describes the instationary pumping of an in-line heating process. In-line heating can be achieved by indirect (e.g. tubular or plate heat exchangers), direct (e.g. steam injection or infusion), volumetric (e.g. Ohmic, microwave, radio-frequent) heating or a combination of these technologies. Preferably, the present invention relates to a process wherein the interplay of heating principle and product residence time distribution produces a non-uniform heating, which would be the case for all indirect and volumetric heating technologies. Most preferably, heating step c) comprises a volumetric heating technology, as such volumetric heating potentially exhibits the largest temperature non-uniformity while having the greatest potential in terms of product quality after heating. Volumetric heating technology preferably comprises one of the groups consisting of Ohmic, microwave and radiofrequent heating and combinations thereof. Preferably the product to be heated is a pumpable food product. The food product might be a homogenous food product, like for example a soup without any solid pieces.

The pumpable food product may also comprises solid pieces and therefore be heterogeneous. Suitable pieces might be solid vegetable and or fruit pieces (e.g. carrot, pumpkin), textured proteins (e.g. meat, meat balls), complex carbohydrates (e.g. pasta) or other complex solid inclusions (e.g. rice, filled noodles). "Solid" is intended to mean a consistency that is persistently higher (i.e. do not dissolve or disintegrate significantly during processing) than that of the surrounding pumpable food product and preferably well comparable to that of freshly cooked pieces that are not over-cooked. Clearly, this texture may vary between different types of pieces. E.g. tomato pieces may have a softer texture than cooked carrot pieces or meat balls. Preferably, the pumpable food product comprises solid pieces in an amount of lower than 80 w/w %, more preferably in an amount of lower than 50 w/w %, even more preferably in an amount of lower than 25 w/w/%, more preferably lower than 5 w/w % or most preferred lower than 3 w/w %, and can for example be from 0 to 80 w/w % more preferably, in an amount of from 1 to 50 w/w %, or from 5 to 25 w/w %, based on the total mass of the food product including the solid pieces. The piece content could preferably be between 0-25 w/w %. The preferred diameter of the solid pieces is between 3 mm and 50 mm, more preferably between 4 mm and 30 mm and most preferably between 5 mm and 20 mm. The diameter is to be measured as the longest possible diagonal through the particle.

The process according to the invention is preferably used to cook, pasteurize or sterilise a food product. Therefore, preferably the food product is heated to a final temperature between 60 and 175° C., preferably between 70 and 140° C. In the conditions of the present invention, the development of the laminar axial velocity distribution is largely avoided, with a significant reduction of the velocity gradients in the liquid. The result is a velocity profile which is flatter compared to the laminar flow velocity profile, which hence exhibits a smaller distribution of residence times. Another benefit may occur in heterogeneous products (liquid and particles), where the forces applied during acceleration prevent particles from sticking to walls and limit component stratification, consequently limiting differential heating.

The present invention has been exemplified in the following example:

EXAMPLES

Example 1

Application to Model Liquids

The effect of the current invention will be demonstrated using a model liquid heated in the stationary and the proposed instationary flow regime over a wide range of viscosities.

a—Preparation & Properties of the Model Fluid

Six model fluids were prepared having the following compositions (table 1).

TABLE 1

Composition and conductivity of the model fluids employed. Kinematic viscosity $v$ measured for all fluids at a shear rate $\gamma = 100\ s^{-1}$.

| fluid number | starch (g/l) | NaCl (g/l) | Mushr. (g/l) | $v$ (Pa s) |
|---|---|---|---|---|
| 1 | 20 | 5 | 1 | $2 \times 10^{-6}$ |
| 2 | 25 | 5 | 1 | |
| 3 | 30 | 5 | 1 | |
| 4 | 35 | 5 | 1 | |
| 5 | 40 | 5 | 1 | $56 \times 10^{-6}$ |
| 6 | 45 | 5 | 1 | |

For each case a batch of 300 kg was prepared following the customary steps of dispersing and activating the starch (Purity HPC) in potable water (5 minutes at 90° C.), adding and dissolving the salt, mixing in the tracer mushroom particles (0.2-1 cm size) and cooling down to a temperature of 50° C. The kinematic viscosity ($v$) of the prepared model fluids was measured off-line in a roto-viscometer and fell covered within the preferred range.

b—Process Description

The apparatus to exemplify the present invention is a pilot scale Ohmic sterilizer from the Emmepiemme company, having 34 mm internal diameter tubes and a capacity of 500 kg/hr. It comprises a pump which is connected with a connection tube to an ohmic heating tube at an entry of the ohmic heating tube. The ohmic heating tube may comprise several dielectric pipes which are consequently connected to each other via metal junctions. The metal junctions are in contact with the food product to be heated inside of the ohmic tube. The end of the heating stage comprises an exit from which the heated food product enters in the downstream section of the equipment (holding tube, coolers and collection tanks).

c—Process Parameters

The instationary flow condition is generated by a double-acting reciprocating piston pump with mechanical drive command. The pump control software was modified to deliver the instationary flow condition with constant average flow rate. The indicated values for t1 fulfill the requirement of the formula $t1 < d^2/16\ v$. Taking a tube diameter of 0.034 m and a kinematic viscosity of $56.10^{-6}$ Pa s (fluid 5 from table 1) yields a required $t1 < 10$ s. Clearly t1 from table 2 for fluid 5 fulfils this requirement.

TABLE 2

Time settings for the unsteady flow process.

| fluid number | t1 (s) | t2 (s) | t3 (s) | t4 (s) |
|---|---|---|---|---|
| 1 | 0.4 | 0 | 0.4 | 0.2 |
| 2 | 0.4 | 0 | 0.4 | 0.7 |
| 3 | 0.3 | 0 | 0.3 | 0.2 |
| 4 | 0.4 | 0 | 0.4 | 0.7 |
| 5 | 0.3 | 0 | 0.3 | 0.2 |
| 6 | 0.4 | 0 | 0.4 | 0.5 |

For a 300 kg/hr massflow rate, a 25-30 kW (electric) heating duty resulted in an approximate average temperature differential across the heating stage of 80° C. For each model fluid, heating was conducted with steady and with the pulsed flow conditions. The time intervals for the pulsed flow according to FIG. 1 are given in table 2.

d—Heating Performance

Figure 2:
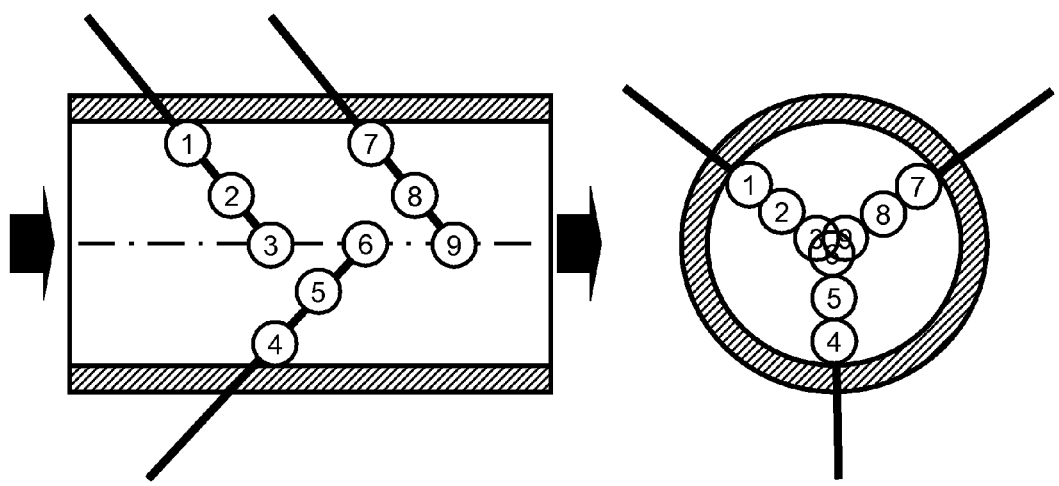
FIG. 2 shows the radial and angular locations of the multipoint temperature sensors.

Temperatures were measured over a period of stable operation of at least 5 minutes on three angular positions at three radial positions, as depicted in FIG. 2. (multi-measurement point).

The difference between the maximum and minimum temperature recorded at any of these nine locations are shown in table 3, for each liquid comparing the steady with the pulsed flow conditions. For each measurement location a moving average over a second interval was employed to dampen random fluctuations. A relatively high difference indicates a high temperature distribution in the cross section of the tube.

TABLE 3

Temperature differential between the 9 locations on the multi-point temperature sensors

| | $T_{max} - T_{min}$ (° C.) | |
|---|---|---|
| fluid number | steady | pulsed |
| 1 | 2.3 | 2.1 |
| 2 | 2.3 | 2.1 |
| 3 | 6.7 | 1.0 |
| 4 | 16 | 3.6 |
| 5 | 21 | 9.2 |
| 6 | 20 | 13 |

In steady flow conditions (constant flow rate) the product shows a temperature differential up to 21° C. (for fluid 5). This is due to the different liquid layer residence time (primary effect), compounded by density driven stratification (secondary effect) in horizontal tubes. The process of the present invention results in a strong reduction in the temperature difference as measured by the multi-measurement point. Pulsed flow clearly imposes a new flow dynamic condition and a strong improvement of the heating uniformity.

The invention claimed is:
1. A process for heating a pumpable food product comprising the steps of:

a) providing a pumpable food product,
b) transporting the pumpable food product through a continuous flow passage,
c) heating the pumpable food product during at least part of the transporting of step characterised in that the flow rate of transportation during step b) comprises phases of acceleration and phases of deceleration, wherein the phases of acceleration and of deceleration periodically repeat; and wherein the phases of acceleration take a time t1 of between about $1*10^{-2}$ and about 10 seconds;

at least one phase of acceleration is followed by a phase of constant velocity having a duration which is less than 100 seconds;

the phases of deceleration have a duration of between $1*10^{-2}$ and 10 seconds;

the phase of deceleration being followed by a rest period t4; wherein the speed of the pumpable food product is between about 0.01 m/s and about 5 m/s;

wherein the pumpable food product is selected from the group consisting of a bouillon, a soup, a sauce, a gravy and a beverage.

2. Process according to claim 1, wherein the heating in step c) comprises a volumetric heating technology.

3. Process according to claim 1, wherein the pumpable food product comprises solid pieces in an amount of from 0 to 80 w/w %.

4. Process according to claim 1, wherein the kinematic viscosity of the liquid phase of the pumpable food product is between $10^{-7}$ to 10 $m^2/s$ at 25° C.

\* \* \* \* \*